US008094370B2

(12) United States Patent
Lewis

(10) Patent No.: US 8,094,370 B2
(45) Date of Patent: Jan. 10, 2012

(54) CLADDING PUMPED FIBRE LASER WITH A HIGH DEGREE OF PUMP ISOLATION

(75) Inventor: Steffan Lewis, Rugby (GB)

(73) Assignee: GSI Group Ltd., Rugby (GB)

( * ) Notice: Subject to any disclaimer, the term of this patent is extended or adjusted under 35 U.S.C. 154(b) by 232 days.

(21) Appl. No.: 12/470,074

(22) Filed: May 21, 2009

(65) Prior Publication Data

US 2009/0251770 A1    Oct. 8, 2009

Related U.S. Application Data

(63) Continuation of application No. PCT/GB2007/050703, filed on Nov. 21, 2007.

(30) Foreign Application Priority Data

Nov. 24, 2006 (GB) .................................. 0623452.0

(51) Int. Cl.
*H01S 3/00* (2006.01)
*H04B 10/12* (2006.01)
(52) U.S. Cl. ........................................ 359/341.1; 372/6
(58) Field of Classification Search ............... 359/341.1; 372/6
See application file for complete search history.

(56) References Cited

U.S. PATENT DOCUMENTS

| | | | |
|---|---|---|---|
| 4,553,238 A | 11/1985 | Shaw et al. | |
| 4,815,079 A | 3/1989 | Snitzer et al. | |
| 4,829,529 A | 5/1989 | Kafka | |
| 4,974,932 A | * 12/1990 | Nattermann et al. | ......... 385/124 |

(Continued)

FOREIGN PATENT DOCUMENTS

EP    0783117 A2    7/1997

(Continued)

OTHER PUBLICATIONS

Griebner, U. et al. "Efficient laser operation with nearly diffraction-limited output from a diode-pumped heavily Nd-doped multimode fiber" Optics Letters, vol. 21, No. 4, pp. 266-268. Feb. 15, 1996.

(Continued)

*Primary Examiner* — Eric Bolda
(74) *Attorney, Agent, or Firm* — Gesmer Updegrove LLP

(57) ABSTRACT

An optical fibre laser or amplifier device is disclosed, comprising: a rare-earth-doped multi-clad optical fibre having at least three cladding layers, one or more multimode pump laser diodes, and a means of multiplexing a laser signal and the pumping radiation, adapted so that a fraction of the stray signal light originating within the device is captured by one of the intermediate cladding layers of the rare-earth-doped fibre and guided out of the laser structure through the multiplexing system resulting in a reduction in the amount of stray signal radiation impinging upon the pump laser diodes.

Alternatively the device may have a rare-earth-doped multi-clad optical fibre having at least two cladding layers, one or more passive multi-clad optical fibres having at least three cladding layers, one or more multimode pump laser diodes, and a means of multiplexing a laser signal and the pumping radiation, adapted so that a fraction of the stray signal light originating within the device is captured by one of the intermediate cladding layers of the passive multi-clad fibre and guided out of the laser structure through the multiplexing system resulting in a reduction in the amount of stray signal radiation impinging upon the pump laser diodes. Other variations and embodiments are disclosed.

18 Claims, 18 Drawing Sheets

U.S. PATENT DOCUMENTS

| | | | | |
|---|---|---|---|---|
| 5,319,652 A | * | 6/1994 | Moeller et al. | 372/6 |
| 5,822,489 A | * | 10/1998 | Hale | 385/145 |
| 5,864,644 A | * | 1/1999 | DiGiovanni et al. | 385/43 |
| 5,966,491 A | * | 10/1999 | DiGiovanni | 385/127 |
| 5,999,673 A | | 12/1999 | Valentin et al. | |
| 6,434,302 B1 | | 8/2002 | Fidric et al. | |
| 6,826,335 B1 | | 11/2004 | Grudinin et al. | |
| 6,959,022 B2 | * | 10/2005 | Sandrock et al. | 372/6 |
| 7,016,573 B2 | | 3/2006 | Dong et al. | |
| 2002/0172486 A1 | * | 11/2002 | Fermann | 385/128 |
| 2002/0181512 A1 | * | 12/2002 | Wang et al. | 372/6 |
| 2002/0191928 A1 | | 12/2002 | Carter et al. | |
| 2004/0036955 A1 | * | 2/2004 | Digonnet et al. | 359/341.1 |
| 2004/0109225 A1 | * | 6/2004 | Hu et al. | 359/341.1 |
| 2004/0156401 A1 | * | 8/2004 | Sandrock et al. | 372/6 |
| 2005/0232313 A1 | * | 10/2005 | Fermann et al. | 372/6 |
| 2006/0029344 A1 | | 2/2006 | Farroni et al. | |
| 2009/0016387 A1 | | 1/2009 | Durkin et al. | |

FOREIGN PATENT DOCUMENTS

| | | |
|---|---|---|
| EP | 1043815 A | 10/2000 |
| GB | 2379279 B | 10/2005 |
| JP | 2001-51147 A | 2/2001 |
| WO | 99303391 A | 6/1999 |
| WO | 0138244 A | 5/2001 |
| WO | 2005029146 A1 | 3/2005 |

OTHER PUBLICATIONS

Taverner, D. et al. "158-uJ pulses from a single-transverse-mode, large-mode-area erbium-doped fiber amplifier" Optics Letters, vol. 22, No. 6, pp. 378-380. Mar. 15, 1997.

Zawischa, I. et al. "All-solid-state neodymium-based single-frequency master-oscillator fiber power-amplifier system emitting 5.5 W of Radiation at 1064 nm" Optics Letters, vol. 24, No. 7, pp. 469-471. Apr. 1, 1999.

* cited by examiner

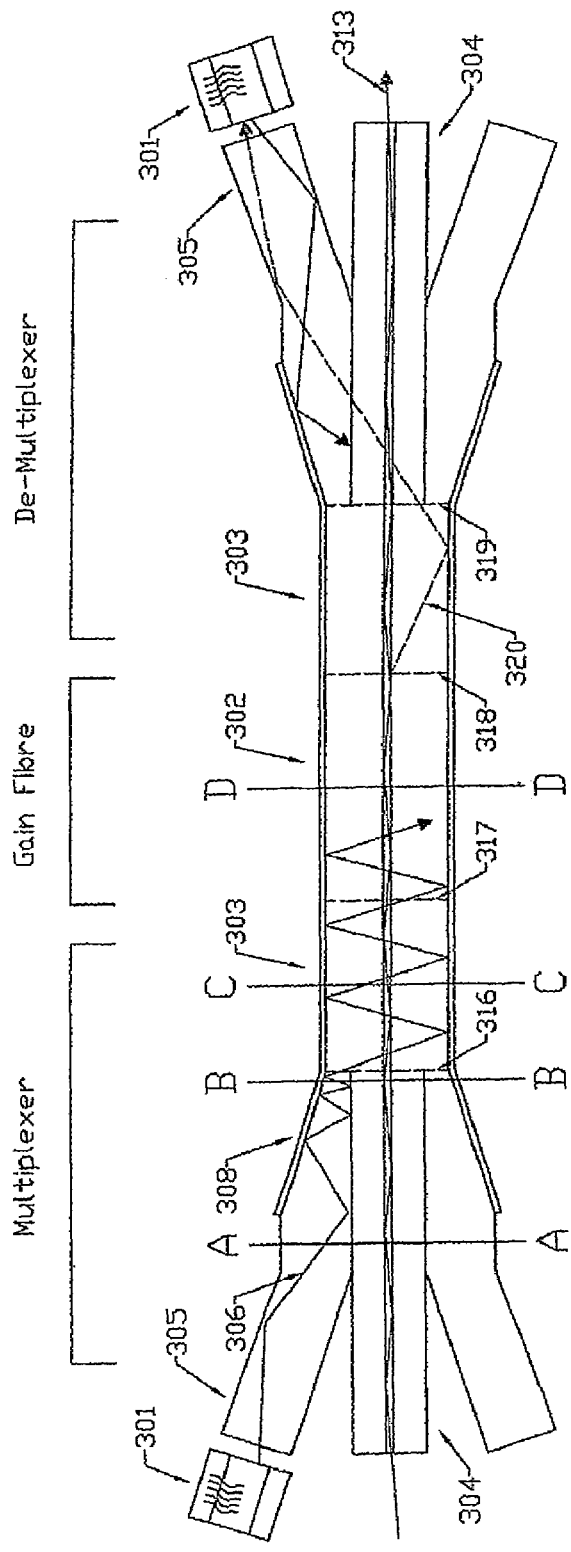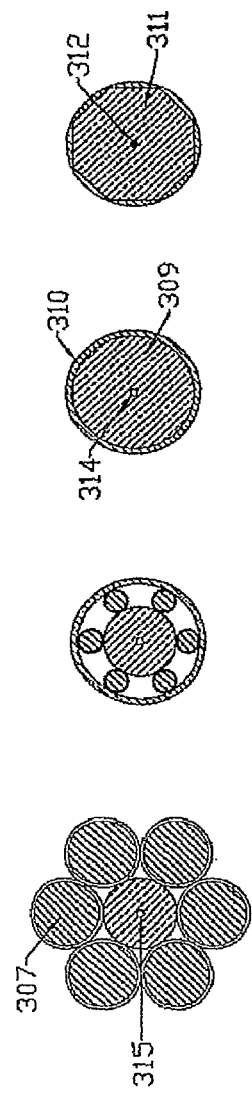
Figure 3

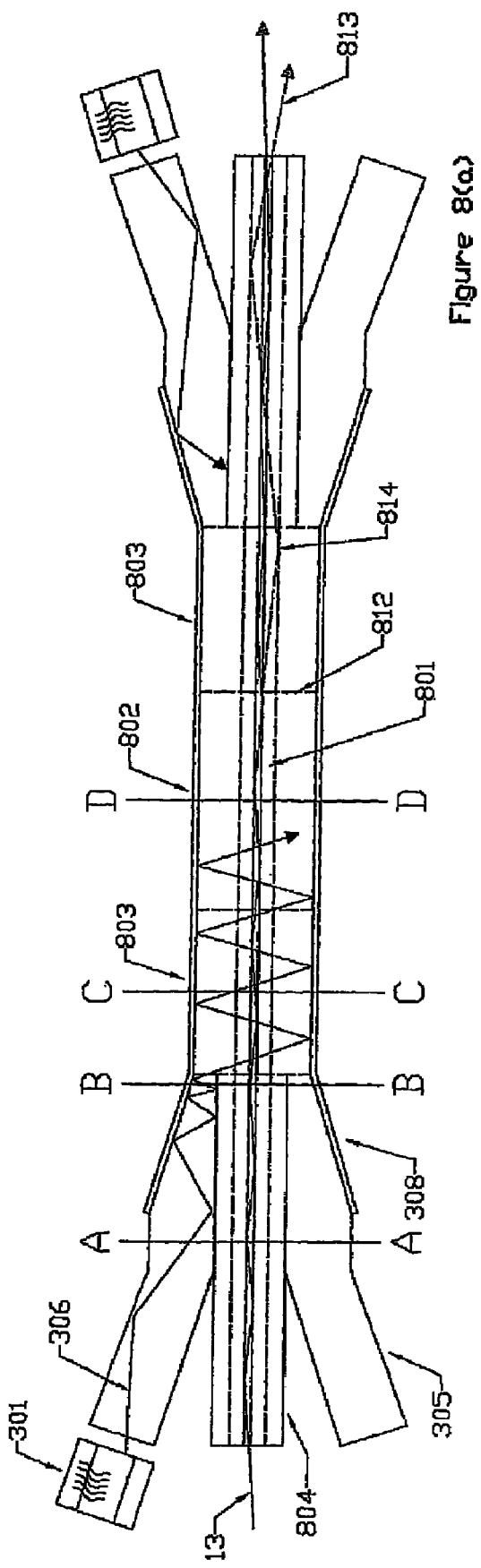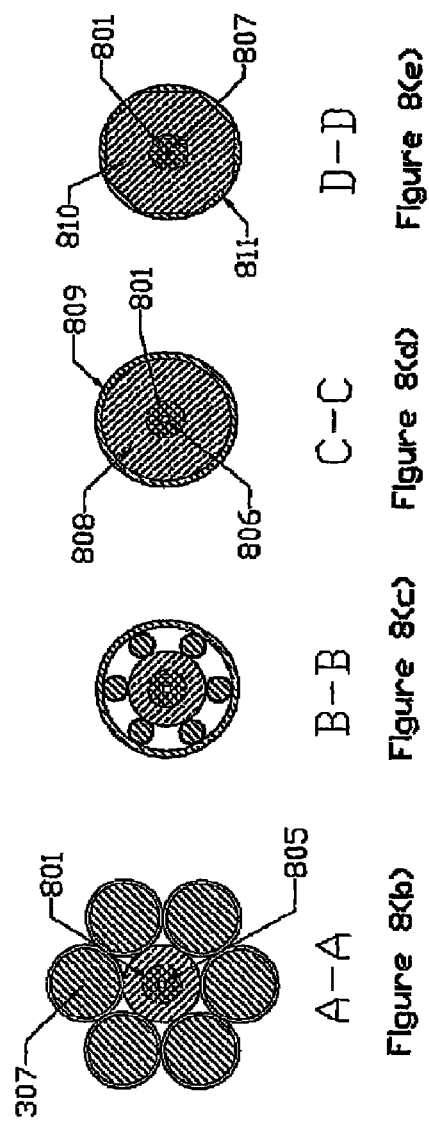
Figure 8

CLADDING PUMPED FIBRE LASER WITH A HIGH DEGREE OF PUMP ISOLATION

This application is a continuation application of and claims priority to PCT/GB2007/050703 filed Nov. 21, 2007, which claims priority to Great Britain application No. 0623452.0 filed Nov. 24, 2006.

BACKGROUND OF THE INVENTION

Cladding pumped fibre lasers are becoming well-known. A core of an optical fibre is doped with a rare earth element to become an active gain medium and pump radiation is applied via a cladding layer. The pump radiation is normally produced by a plurality of semiconductor laser diodes, and a means is provided for coupling their output into the cladding of the rare earth doped fibre. Bragg gratings formed in the core of the optical fibre may be employed as mirrors to form a laser cavity.

Some pump diodes are sensitive to optical feedback from the laser and can be damaged, particularly if the laser is operating in a pulsed mode. In general, the amount of feedback experienced by the pump diodes depends upon the means of coupling between the pump diodes and the cladding pumped fibre.

The main features of previous cladding-pumped fibre laser designs are a multi-clad optical fibre having a rare-earth-doped core, a pump source which is usually a semiconductor laser diode, a means of coupling the pump radiation into the cladding of the multi-clad fibre, and a means of coupling a laser signal into or out of the core of the fibre. As used in the following summary, detailed description, and appended claims the words "pump and signal multiplexing", "de-multiplexing" and the like generally refer to methods of coupling pump radiation into or out of a cladding layer of the multi-clad fibre and coupling signal radiation into or out of the core of the multi-clad fibre will henceforth be referred to as "pump and signal multiplexing" and it is to be understood that this term might be applied to a device which is "de-multiplexing" one or a plurality of the beams.

One feature that differentiates previous cladding pumped fibre lasers from each other is the means of pump and signal multiplexing. Some of these can be classified as:

1. Distributed fibre to fibre pump transfer
2. Bulk optic end-coupling
3. Side coupling
4. Tapered fibre bundle end-coupling U.S. Pat. No. 4,553,238 (Shaw 1985) teaches a distributed fibre to fibre pump transfer method in which pump radiation couples between parallel pump and signal fibres, as does U.S. Pat. No. 6,826,335 (Grudinin 2000). U.S. Pat. No. 4,829,529 (Kafka 1987) teaches bulk optic end-coupling. U.S. Pat. No. 4,815,079 (1989 Polaroid) and U.S. Pat. No. 5,999,673 (1994 Gapontsev) teach side coupling schemes. U.S. Pat. No. 5,864, 644 (1997 DiGiovanni) has been the principal proponent of end-coupling with a tapered fibre bundle and there have been subsequent similar teachings by Fidric U.S. Pat. No. 6,434, 302, WO2005/029146 A1 Gonthier, and Dong U.S. Pat. No. 7,016,573 amongst others.

Another significant feature of previous laser designs is the multi-clad optical fibre with rare-earth-doped core. These fibres typically have a core doped with a rare earth element such as ytterbium, erbium, neodymium, or thulium and at least two cladding layers surrounding the core having successively decreasing refractive indices. These fibres are referred to as double-clad: see for example U.S. Pat. No. 4,829,529 (1987), U.S. Pat. No. 4,815,079 (1989 Polaroid). The first cladding layer functions both as a cladding for the core waveguide and as the core of a larger multimode waveguide concentric with the core which guides pump radiation. The second cladding serves as a cladding for the first cladding waveguide. Rare earth doped multi-clad fibres having more than two cladding layers with successively decreasing refractive index are also known, for example US2002/0191928-A1 (June 2001). These are sometimes known as triple-clad, quadruple-clad etcetera. Multi-clad optical fibres are also known for other applications such as high power laser beam delivery U.S. Pat. No. 4,974,932 (1990), GB2379279 A (2001), or single-mode optical fibres with special dispersion properties used in optical telecommunications JP2001051147 (2001) or attenuation properties EP0783117 A2 (1997).

A recent development in multi-clad optical fibre design is known as large mode area fibre (LMA). An early example of such a fibre was demonstrated by Taverner et al, "158-µJ pulses from a single-transverse-mode large-mode-area erbium-doped fibre amplifier", *Optics Letters*, 1997, Vol. 22, No. 6, pp. 378-380. The principal features of large mode area fibres are increased core diameter and reduced core numerical aperture compared to standard single-mode fibres. One advantage of such fibres is higher power handling due to the larger core and correspondingly smaller power density. Such fibres have become commercially available in the last five years or so and current embodiments are sometimes truly single mode and sometimes support multiple modes in the core. As an example, one commercially available fibre has a core diameter of 20 microns and a core numerical aperture of less than 0.07. It is sometimes desirable to construct a laser out of multi-mode LMA fibre that emits light only in the fundamental mode, see for example "Efficient laser operation with nearly diffraction-limited output from a diode-pumped heavily Nd-doped multimode fibre", *Optics Letters*, 1996, Vol. 21, No. 4, pp. 266-268. A known technique for suppressing laser oscillation in the high order modes is to coil the fibre at a specific bend radius as demonstrated by Zawischa et. al. "All-solid-state neodymium-based single-frequency master-oscillator fiber power-amplifier system emitting 5.5 W of radiation at 1064 nm", *Optics Letters*, 1999, Vol. 24, No. 7, pp. 469-471.

A drawback of some previous fibre laser designs is the susceptibility of the semiconductor pump lasers to damage caused by radiation that enters the pump laser diode cavity. This problem is exacerbated when the laser operates in a pulsed mode, and the peak output power of the laser is much higher than the average. A mechanism for pump diode damage is feedback of stray signal radiation back to the pump diodes; a relatively small fraction of such stray radiation may cause spurious diode outputs or damage the diodes. Stray signal light may occur at splice points and due to macro-bending loss if one or more of the fibres is coiled. Macro-bending loss is typically more significant in LMA fibres due to their increased bend sensitivity.

There is a need to improve the reliability of high power, diode pumped lasers and Amplifiers, and in particular for use with fiber lasers.

SUMMARY OF THE INVENTION

Embodiments of the present invention are directed to solutions of the reliability problem caused by stray signal radiation in high power laser systems. Such problems may be diode damage or spurious outputs from a pump diode that affect system performance and stability.

In one aspect of the invention an optical fibre amplifier system is provided. The amplifier system further includes at least one laser diode to pump the amplifier. Stray radiation originates within the device. The stray radiation may be emitted at or near an interface between surfaces, caused by partial reflection at a curved surface, or from other interactions. The amplifier system includes a waveguide having at least three claddings that confines and guides at least a portion of the stray radiation and causes the radiation to exit the amplifier system along a path that avoids impingement upon the at least one diode. The fraction of stray radiation that impinges the at least one laser diode is thereby reduced and improves the reliability of the system.

An aspect of the invention is to confine the stray signal light to the core region and guide it out of the fibre laser structure without allowing it to impinge on the pump diodes. This is achieved through a combination of the pump and signal multiplexing scheme, the waveguide structure of the rare-earth-doped multi-clad optical fibre, and the waveguide structure of a number of un-doped optical fibres employed in the multiplexer. The principal parts of the inventive fibre laser are therefore: a rare-earth-doped multi-clad optical fibre, a plurality of semiconductor laser diodes providing pump radiation, one or more multimode optical waveguides that receive pump radiation from the laser diodes and transmit it through the pump and signal multiplexer, and a number of un-doped optical fibres that form part of the construction of the pump and signal multiplexer.

According to the present invention there is provided an optical fibre laser or amplifier device, comprising: a rare-earth-doped multi-clad optical fibre having at least three cladding layers, one or more multimode pump laser diodes, and a means of multiplexing a laser signal and the pumping radiation, adapted so that a fraction of the stray signal light originating within the device is captured by one of the intermediate cladding layers of the rare-earth-doped fibre and guided out of the laser structure through the multiplexing system resulting in a reduction in the amount of stray signal radiation impinging upon the pump laser diodes.

In a further aspect, the invention provides an optical fibre laser or amplifier device, comprising: a rare-earth-doped multi-clad optical fibre having at least two cladding layers, one or more passive multi-clad optical fibres having at least three cladding layers, one or more multimode pump laser diodes, and a means of multiplexing a laser signal and the pumping radiation, adapted so that a fraction of the stray signal light originating within the device is captured by one of the intermediate cladding layers of the passive multi-clad fibre and guided out of the laser structure through the multiplexing system resulting in a reduction in the amount of stray signal radiation impinging upon the pump laser diodes The stray radiation may derive from one or more splice joints in the device and/or from macro-bending loss.

Preferably, wherein the doped fibre has a core with refractive index $n_1$, and numerical aperture $NA_{core}$, and at least three cladding layers at least three of which have successively decreasing refractive indices, $n_2$, $n_3$ and $n_4$ with respect to the core.

In a further aspect, the invention provides an optical fibre laser or amplifier with improved pump isolation, comprising: a rare-earth-doped multi-clad optical fibre having a core, and at least three cladding layers at least three of which have successively decreasing refractive indices with respect to the core, one or more multimode pump laser diodes, and a means of multiplexing a laser signal and the pumping radiation, whereby a fraction of the stray signal light originating within the device is captured by an intermediate cladding layer of the rare-earth-doped fibre and guided out of the laser structure through the multiplexing system, resulting in a reduction in the amount of stray signal radiation impinging upon the pump laser diode.

DESCRIPTION OF THE DRAWINGS

The following description may be further understood with reference to the accompanying drawings in which:

FIG. 3(a) shows a cladding pumped fibre gain block;

FIGS. 3(b) to 3(e) show cross-sections through, respectively, A-A to D-D;

FIG. 8(a) shows an embodiment of a cladding pumped fibre constructed in accordance with the present invention to protect the pump lasers from stray lights;

FIGS. 8(b) to 8(e) show cross-sections through, respectively, A-A to D-D of FIG. 8;

DETAILED DESCRIPTION OF THE INVENTION

This invention is a cladding pumped fibre laser structure that has improved confinement of the laser signal to the core region and a lower level of optical feedback to the pump diodes. The invention makes the laser more robust and reliable than previous fibre laser designs.

Figure 1:
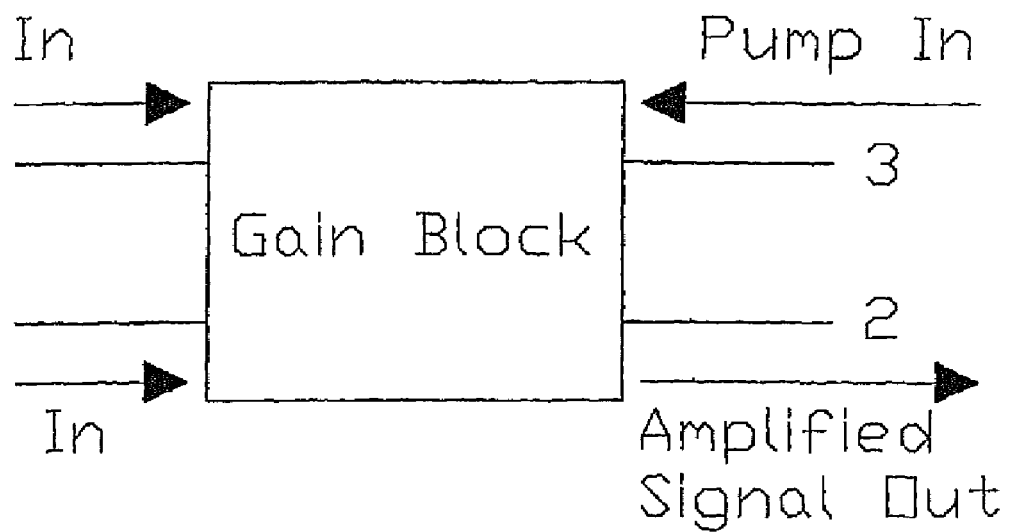
FIG. 1 shows a block diagram of an optical fibre gain block.

A cladding-pumped fibre laser typically includes an optical sub-system shown as gain block in FIG. 1. The function of this gain block, as illustrated in FIG. 1, is to amplify an optical signal. The energy required by the gain block to amplify the signal is provided in the form of optical pumping radiation. Typically the gain block has two ends; the signal is coupled into the gain block via an optical fibre input at the first end, port 1, and the amplified signal exits the gain block via another optical fibre at the second end, port 2; the pumping radiation may be coupled into the gain block from one or both ends via optical fibre inputs, ports 3 and 4. The gain block may operate bi-directionally with signals propagating in both directions through the device simultaneously or with external signal feedback to form a laser.

Figure 2:
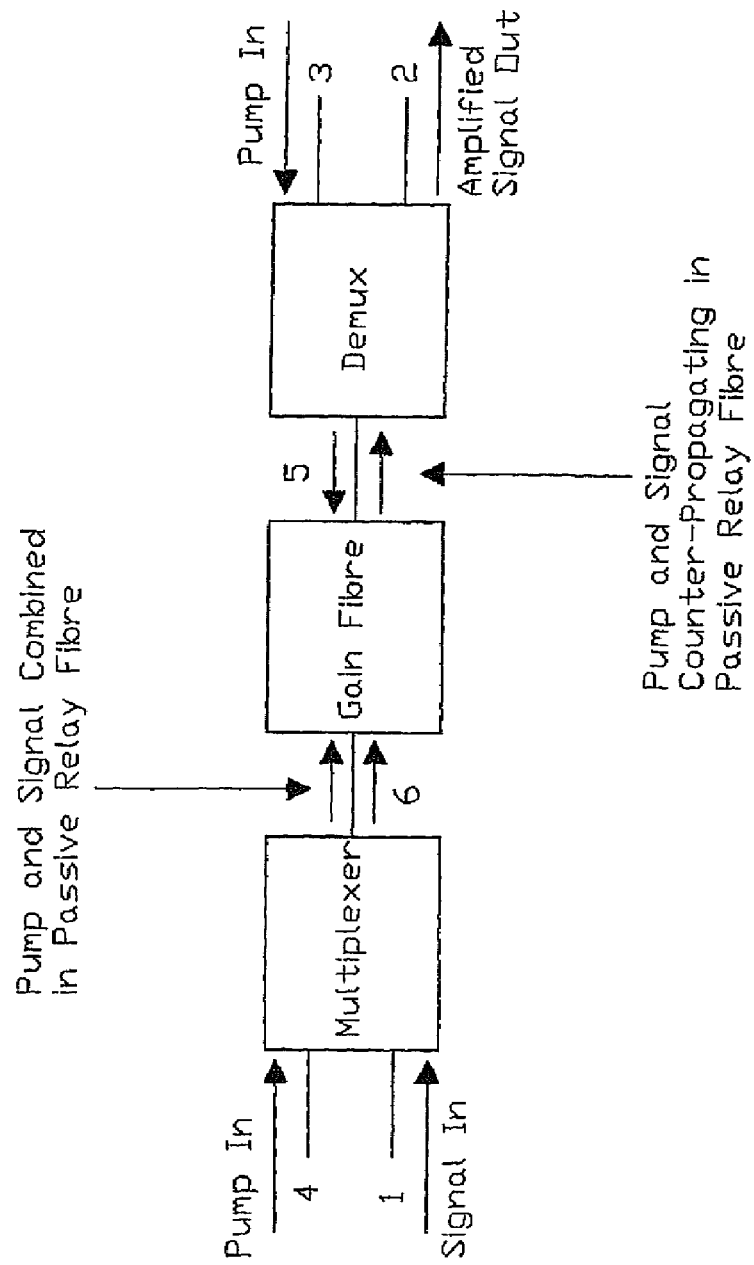
FIG. 2 shows a block diagram of the main components of an optical fibre gain block.

FIG. 2 shows a block diagram illustrating the main elements of the gain block. These are the multiplexer, the gain fibre, and the de-multiplexer. Sections of passive optical fibre, known as "relay fibre", connect the multiplexer and de-multiplexer to the gain fibre. The gain fibre provides a gain medium that operates as a laser amplifier. It is a rare earth doped optical fibre that absorbs the pumping radiation and provides optical gain to the signal. The purpose of the multiplexer is to couple the input signal and the forward-traveling pump from ports 1 and 4 into the relay fibre, port 6. The purpose of the de-multiplexer is to couple the backward-traveling pump radiation from port 3 into the relay fibre, port 5, and to couple the amplified forward-traveling signal out of the relay fibre from port 5 to port 2. When the signal propagates in the opposite direction through the device, the roles of the multiplexer and de-multiplexer are reversed. A multiplexer may simultaneously multiplex and demultiplex when signals propagate in both directions. For brevity, the process of coupling pump radiation into or out of a cladding layer of the multi-clad fibre and coupling signal radiation into or out of the core of the multi-clad fibre will henceforth be referred to as "pump and signal multiplexing" and it is to be understood that this term might be applied to a device which is "de-multiplexing" one or more of the beams.

FIG. 3 (not to scale) shows several details of an exemplary gain block that illustrates the problem of pump diode damage due to stray signal light. The main elements: multiplexer, gain fibre, demultiplexer, are labeled above the figure. A typical mechanism for diode damage is that a small fraction of the laser signal escapes from the core of the optical fibre into the cladding at a splice point (a join between two fibres). This stray light then propagates back to the pump diodes via the cladding. The device comprises a plurality of semiconductor pump laser diodes 301, a length of rare-earth-doped double-clad optical fibre 302 that might be a few meters or tens of meters in length, two lengths of passive double-clad relay fibre 303 each of which might be several meters long, two un-doped signal feed-through fibres 304, and a plurality of multimode pump delivery fibres 305 arranged in a bundle around the signal feed-through fibre as illustrated by section A-A.

The fibres are joined together by splicing, a thermal process, to form a monolithic glass structure.

The operating principle of the gain block is illustrated by the rays in the diagram. A ray of pump laser light 306 is coupled into the core 307 of one of the multimode pump fibres. The pump fibre has a tapered section 308 and the tapered end is joined to the first cladding 309 of one of the relay fibres in such a way that the output of the tapered pump fibre couples into said first cladding and is guided by total internal reflection at the interface with the second cladding 310. The pump light is transmitted through the relay fibre to the first cladding 311 of the rare earth doped double clad fibre and absorbed by the rare earth doped core 312. The absorption of the pump laser light by the rare earth doped ions in the core excites them to a higher atomic energy level creating a population inversion which forms the basis for light amplification. A laser signal 313 propagates in the core of the rare earth doped fibre and is amplified by the excited rare earth ions. The laser signal is guided into or out of the core of the rare earth doped fibre via the cores of the relay fibres 314 and the signal feed-through fibres 315.

The structure shown in FIG. 3 is operating as an amplifier. A laser signal is injected into the rare earth doped fibre from one side and an amplified signal is output from the opposite end.

Figure 4:
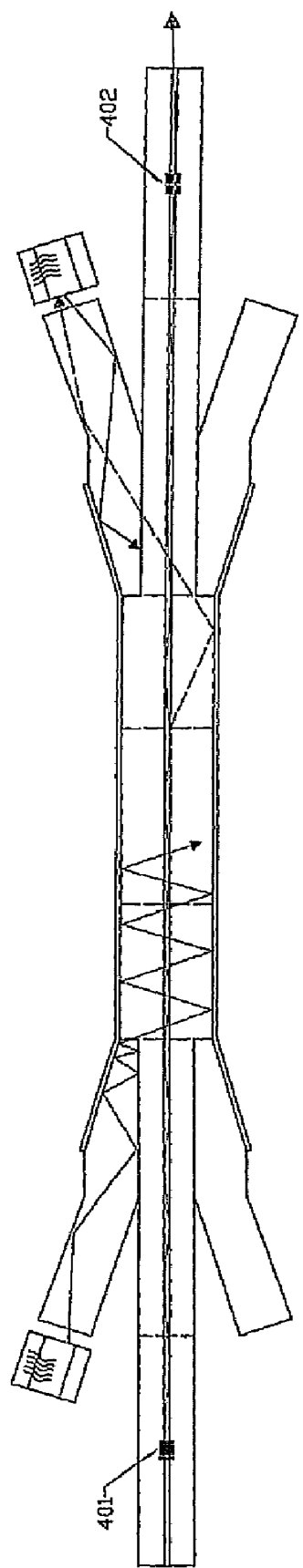
FIG. 4 shows a cladding pumped fibre laser.

It is also possible to operate such a structure as a laser by providing signal feedback. This is illustrated in the embodiment of FIG. 4. Typically, feedback is provided by fibre Bragg grating reflectors, which are essentially permanent mirrors formed in the core of an optical fibre. 401 is a Bragg grating high reflector providing close to 100% reflection and 402 is a partial reflector (otherwise known as the output coupler).

Figure 5:
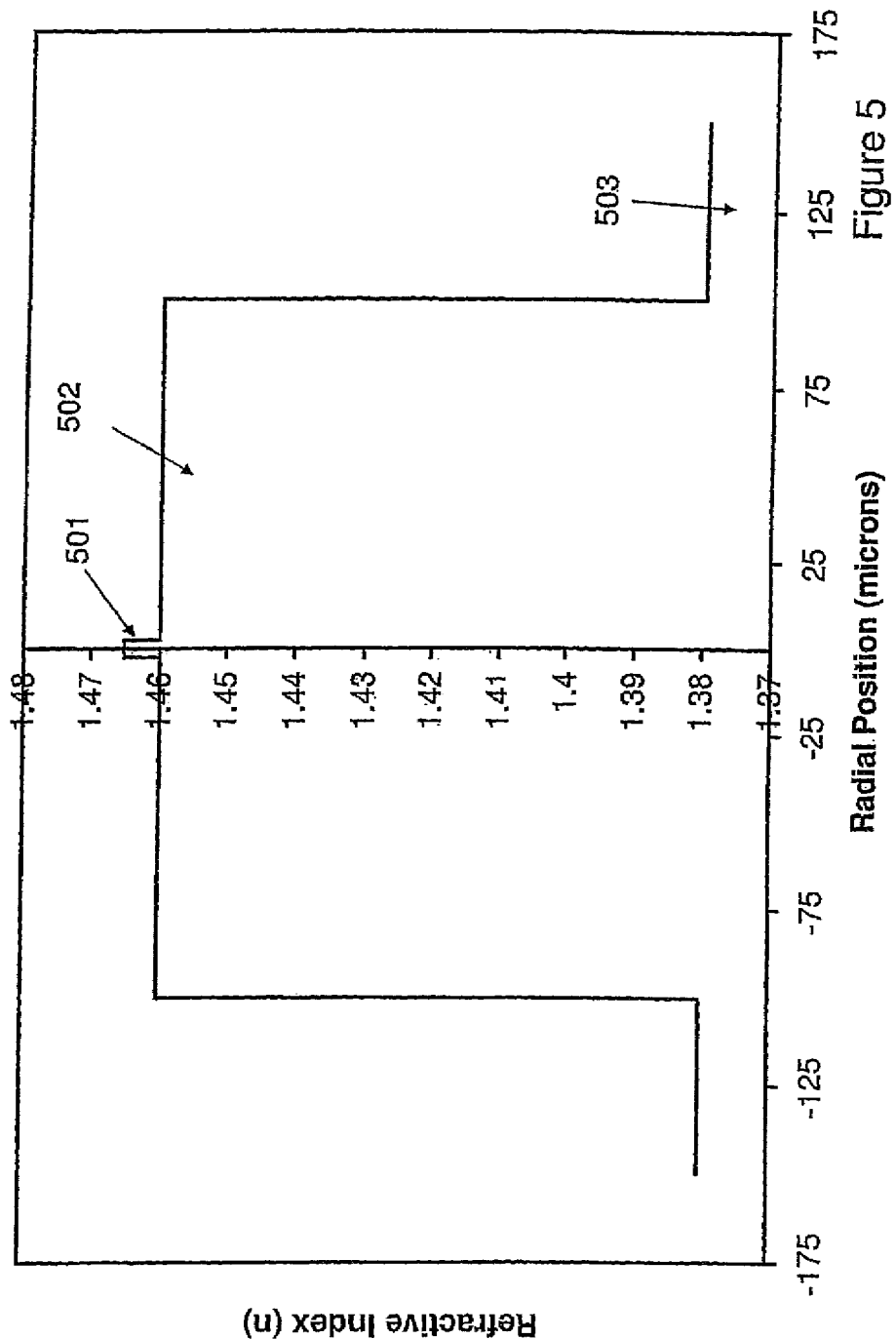
FIG. 5 shows a representative refractive index profile.

FIG. 5 shows a representative refractive index profile of the double clad fibres 302 and 303.

Figure 6:
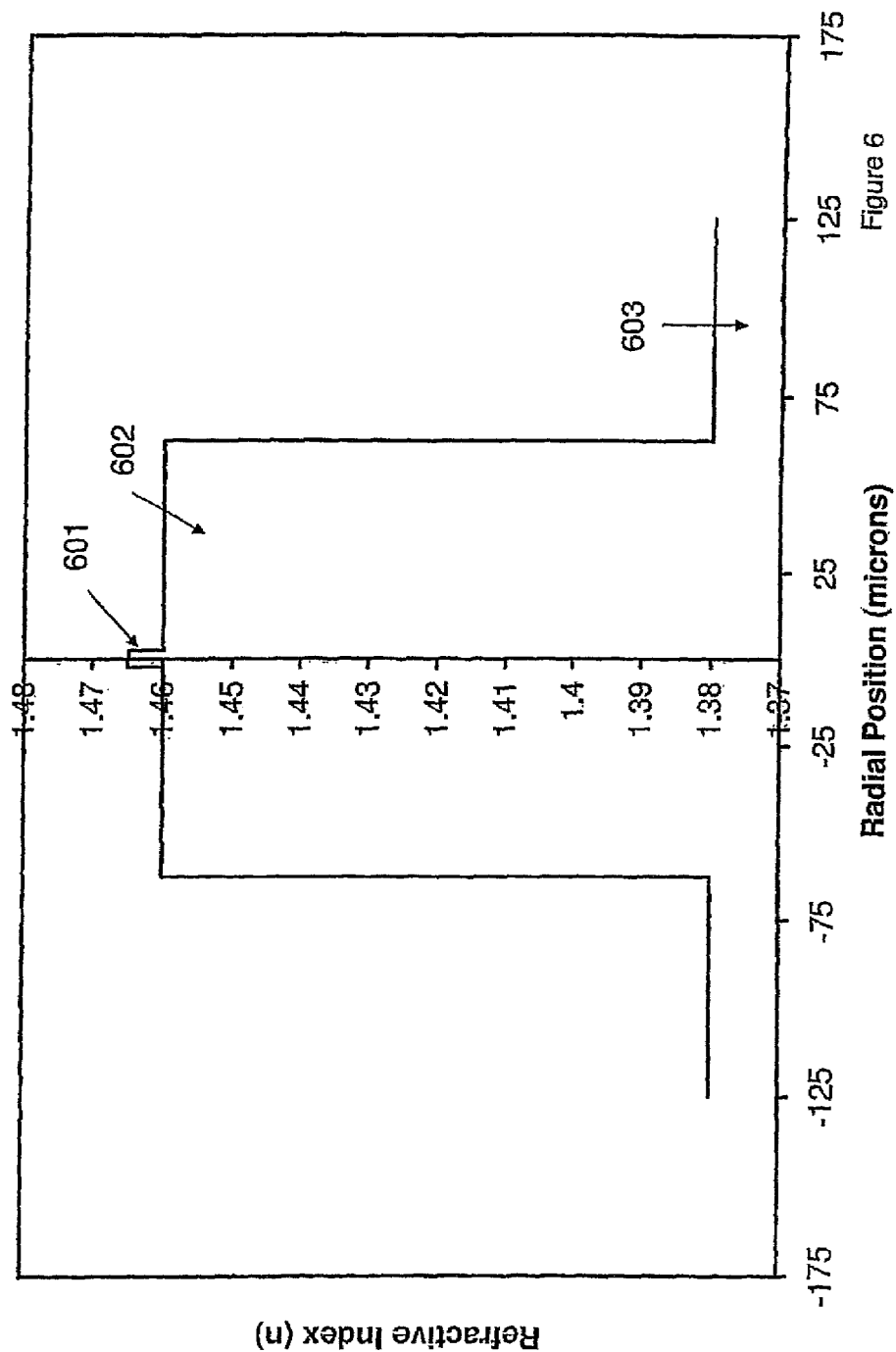
FIG. 6 shows a further representative refractive index profile.

FIG. 6 shows a possible refractive index profile for the signal feed-through fibre 304. The refractive index n is plotted as a function of radial distance in microns from the fibre axis. The waveguide aspects of an optical fibre structure are characterised by the refractive index and geometry. In this idealized example, the fibre consists of three regions: a core 501 having a refractive index $n_1$, a first cladding 502 having a refractive index $n_2$, and a second cladding 503 having a refractive index $n_3$. By way of example, the core diameter might be 5 microns, the first cladding diameter 200 microns and the second cladding diameter 300 microns. Typically, the core and first cladding are of glass construction and the second cladding consists of a low refractive index polymer material. Two important parameters of an optical fibre are the numerical aperture (NA) and the fibre parameter V. These are defined as:

$$NA = \sqrt{n_1^2 - n_2^2} \quad (1)$$

$$V = \frac{2\pi}{\lambda} a \sqrt{n_1^2 - n_2^2} \quad (2)$$

where $n_1$ is the refractive index of the core and $n_2$ is the refractive index of the cladding, $\lambda$ is the free space wavelength of the light that is being guided, and a is the radius of the core. The numerical aperture is closely related to the maximum ray angle in the core that will be totally internally reflected at the core cladding interface. Typically, a higher NA will guide steeper ray angles. There is also a connection between the fibre parameter V and the number of transverse radiation modes guided by the core. Higher V values correspond to a larger number of guided modes, and at V value of less than 2.405 just one transverse mode is guided by the core. In this case the fibre is known as "single-mode". Fibres supporting more than one transverse mode are known as "multi-mode". The numerical aperture of the core waveguide in the above example prior art laser is 0.12 and the numerical aperture of the pump waveguide is 0.46. Referring to equation 2 it can be inferred that the rare earth doped core is single moded and the pump waveguide defined by the first and second cladding layers is multi-moded.

In some embodiments, the core size may be preferably between 10 and 50 μm. The core NA may preferably be between about 0.6 and 0.10. The first cladding may have a diameter between 50 μm and 200 μm and a NA of 0.1 to 0.12, The third cladding may have a diameter of between 200 and 1,000 μm and a NA of 0.40 and 0.46. Note that in other embodiments the values may be within these ranges or less than or greater than. The values are illustrative only and non-limiting.

Stray radiation may originate at various locations within the system.

Referring to the example of FIG. 3, four splice points are shown between the pump fibres marked 316, 317, 318, and 319. In general, a fraction of the signal light may escape from the core at a splice point due to the inevitable discontinuity at the join. For the purpose of illustration, a ray of signal light 320 is shown escaping from the core at splice point 318. The angle of the ray is exaggerated for clarity. This stray signal ray may propagate in the first cladding of the double clad fibres and eventually propagate back to a pump laser diode via one of the multimode pump fibres. If the power of the signal is sufficiently high, it may damage the pump laser causing it to fail.

Figure 7:
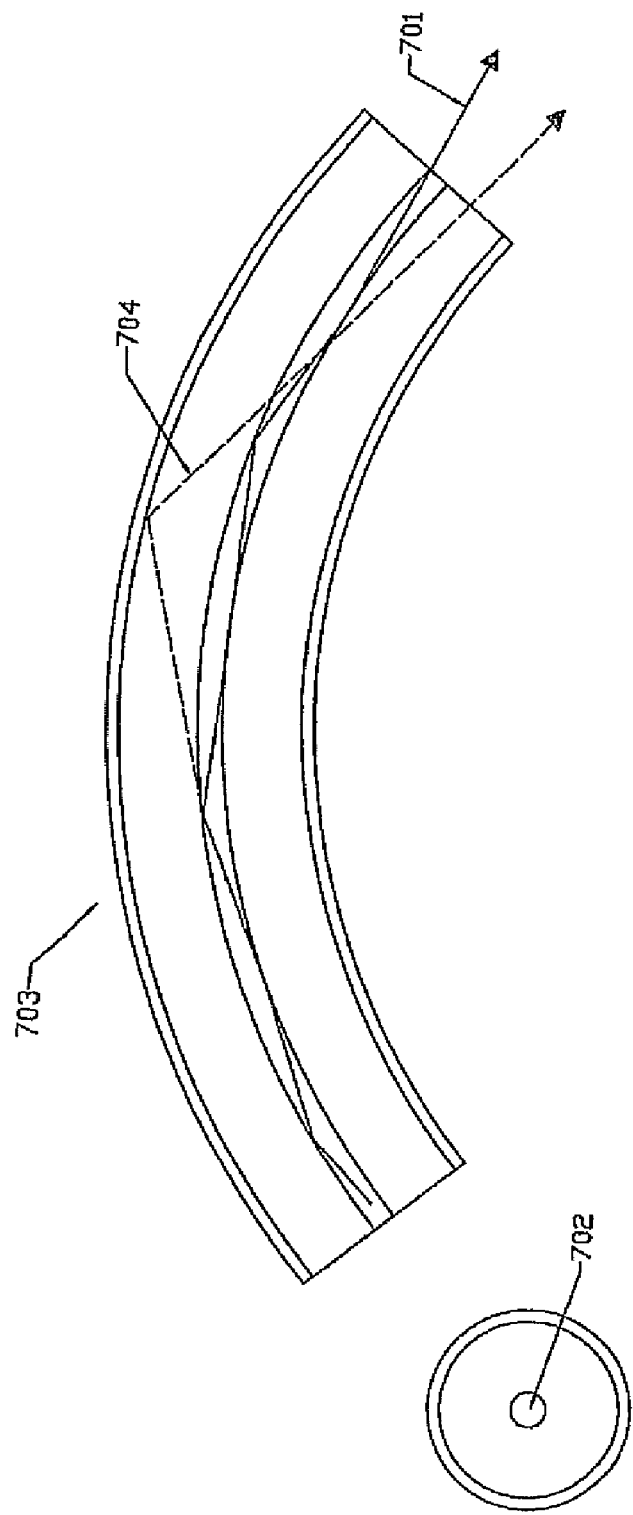
FIG. 7 shows a bent fibre.

Another mechanism that causes stray signal radiation is macro-bending loss from the core. FIG. 7 illustrates this process. A laser signal 701 propagates in the core 702 of a multi-clad optical fibre 703. This fibre is coiled at a bend radius such that the light in the core experiences a macro-bending loss. This causes a fraction of the light in the core to escape into the cladding and is illustrated by the ray 704, although in reality the power will be shed from the core in a distributed fashion along its length. An implication of this approach is that even in the absence of splices, stray light may escape into the cladding due to bending and damage the pump diodes as previously described.

FIG. 8 shows one embodiment of the present invention.

FIGS. 3 and 8 show several common features. Some of the parts are common to the laser shown in FIG. 3 and are described in the earlier discussion surrounding that figure. The operating principle of the laser of FIG. 8 is therefore also broadly similar to the laser of FIG. 3. However, a feature of the embodiment of FIG. 8 is an additional cladding layer 801 running through the doped, relay, and feed-through fibres. One purpose of this additional cladding layer is to confine stray signal light to a region around the core and prevent it from propagating back to the pump diodes.

Figure 9:
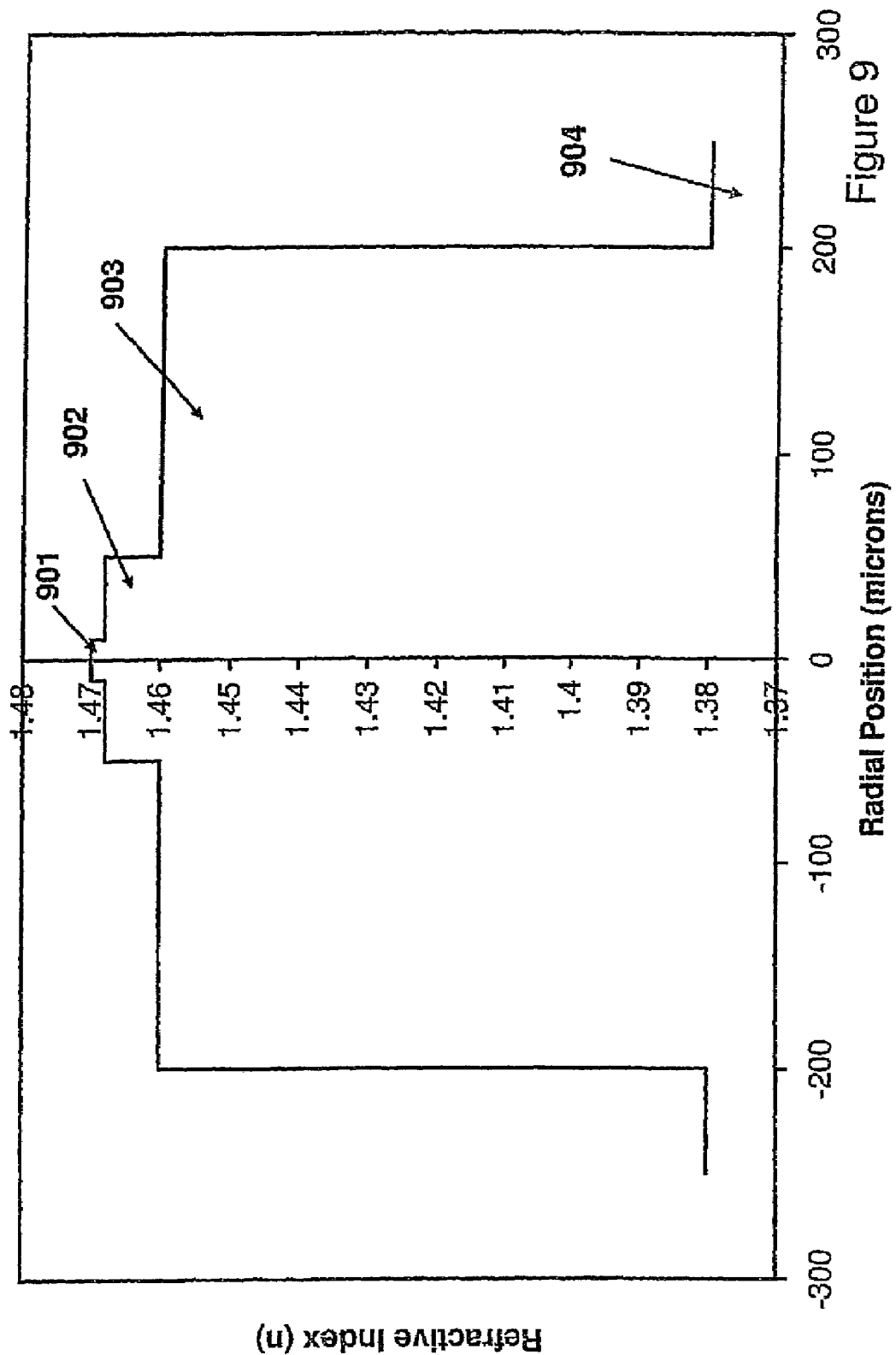
FIG. 9 shows a representative refractive index profile.

FIG. 9 shows the refractive index profile of such a fibre. It has four distinct regions: the core 901, a first cladding (sometimes referred to as a "pedestal") 902, a second cladding 903, and a third cladding layer 904. By way of an example, the diameters of these regions might be 20, 100, 400, and 500 microns respectively. The refractive indices of these regions are denoted $n_1$, $n_2$, $n_3$, and $n_4$ respectively and the refractive index decreases successively from layer to layer from the centre of the fibre. The core has a numerical aperture $NA_{core}$ defined by $n_1$ and $n_2$. The first cladding has a numerical aperture $NA_{clad1}$ defined by $n_2$ and $n_3$ and the second cladding has a numerical aperture $NA_{clad2}$ defined by $n_3$ and $n_4$. The core, first and second cladding layers are of glass construction and the third cladding layer consists of a low refractive index polymer. By way of example, values of the numerical apertures might be: $NA_{core}=0.07$, $NA_{clad1}=0.1$, $NA_{clad2}=0.46$. By way of example, the cross-section of the second cladding layer might be shaped in some way, for example octagonal, although this is not essential for the operation of a cladding-pumped fibre laser.

Referring again to FIG. 8, the passive relay fibre 803 has a similar refractive index profile to the doped optical fibre, consisting of a core and three cladding layers as shown in FIG. 9. It is normally circular in cross-section. The diameters of the core, first, second, and third claddings and the corresponding refractive indices of these four regions might be the same or similar to those of the corresponding regions in the doped fibre shown in FIG. 9.

Figure 10:
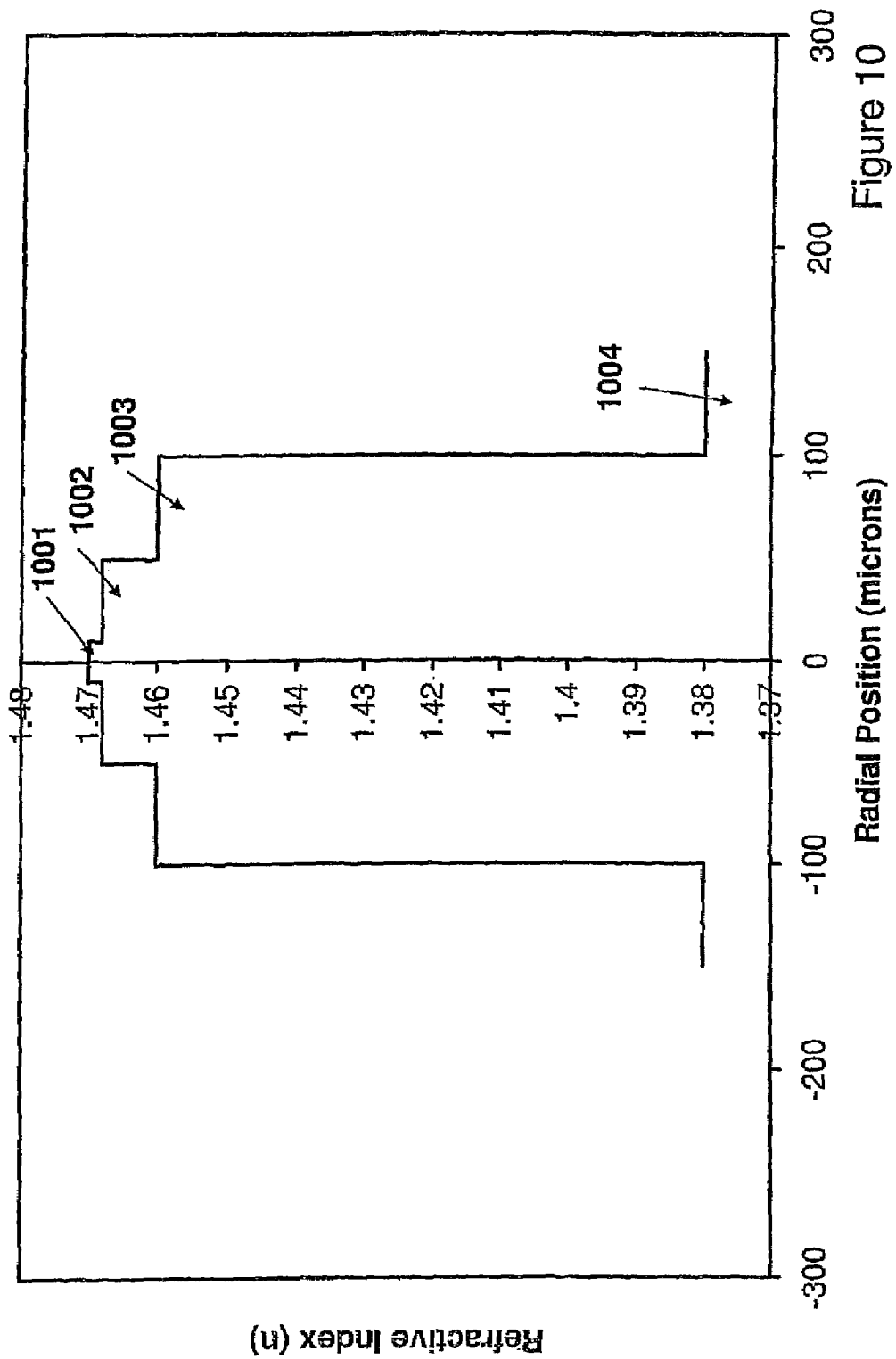
FIG. 10 shows a further representative refractive index profile.

The refractive index profile of the signal feed-through fibre is shown in FIG. 10. It has a core 1001, a first cladding 1002, a second cladding 1003, and (outside the multiplexer) a third cladding 1004. The core, first, and second claddings are of glass construction and the third cladding is a low refractive index polymer. Inside the multiplexer the third cladding is removed prior to assembly of the device since the feed-through and pump fibres are subjected to high temperatures during fusion that a polymer would not withstand. The dimensions of the core, and first cladding layers and the refractive indices of the core, first, and second cladding layers are broadly similar to those of the relay and doped fibres. The second cladding layer is typically smaller in diameter, for example 200 microns.

Figure 11:
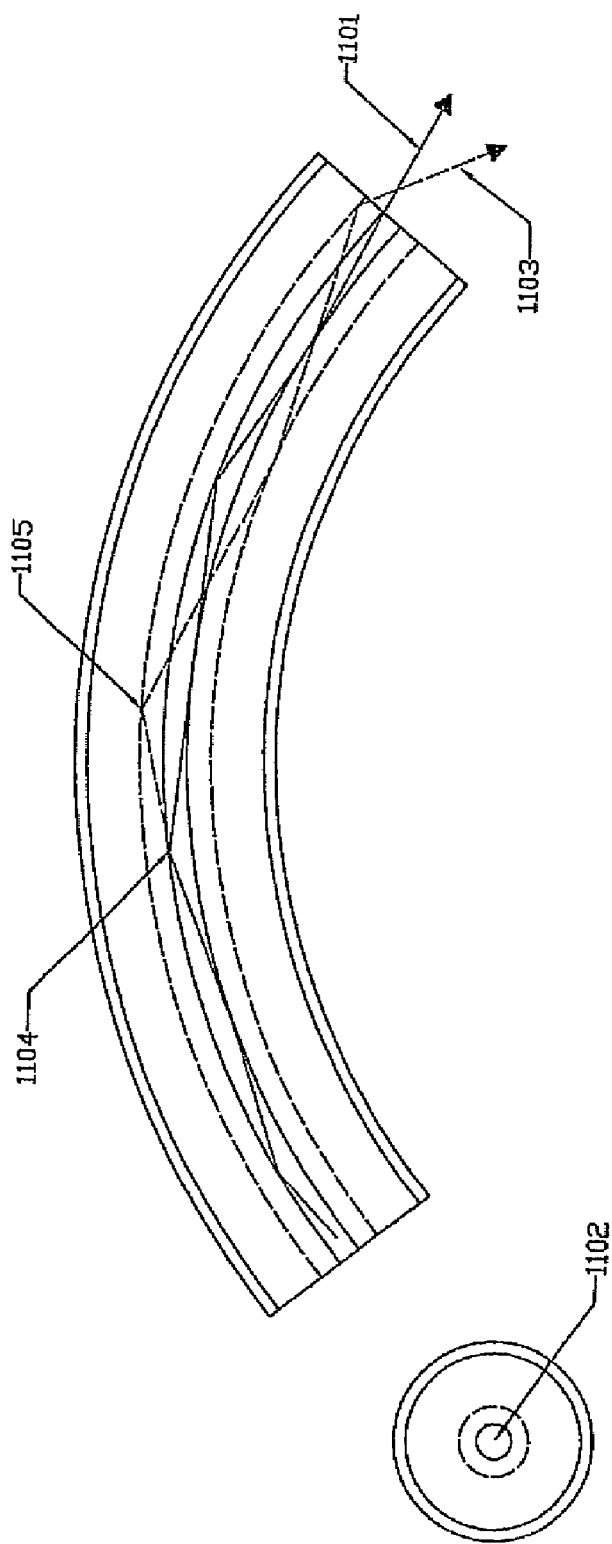
FIG. 11 shows a bent fibre.

The operation of the laser is further illustrated by FIGS. 8 and 11. The two main sources of stray signal that were identified previously are the splice points and macro-bending loss. The role of the first cladding layer is to capture and guide the stray signal light and confine it to the core region. The continuation of this layer through the doped, relay, and feed-through fibre provides a path for guiding the stray signal out of the laser without damaging the pump laser diodes. FIG. 8 shows a stray ray of signal light 813 escaping from the core at splice point 812. This ray is totally internally reflected at the boundary between the first and second cladding layers 814 and subsequently guided out of the laser in the first cladding. FIG. 11 shows a bent section of multi-clad optical fibre. A signal 1101 propagates in the core 1102 of the fibre. A ray of signal light 1103 is shown coupling out of the core at point 1104 and totally internally reflecting at the boundary between the first and second cladding layers 1105. The ray is subsequently guided in the first cladding layer out of the laser structure through the relay fibre and the feed-through fibre as described above. In a real situation, the light that couples out of a bent fibre does so in a distributed fashion along the length of the fibre not at a single point as shown in FIG. 11. However, the mechanism of capturing and guiding the stray light in the first cladding is the same.

Figure 12:
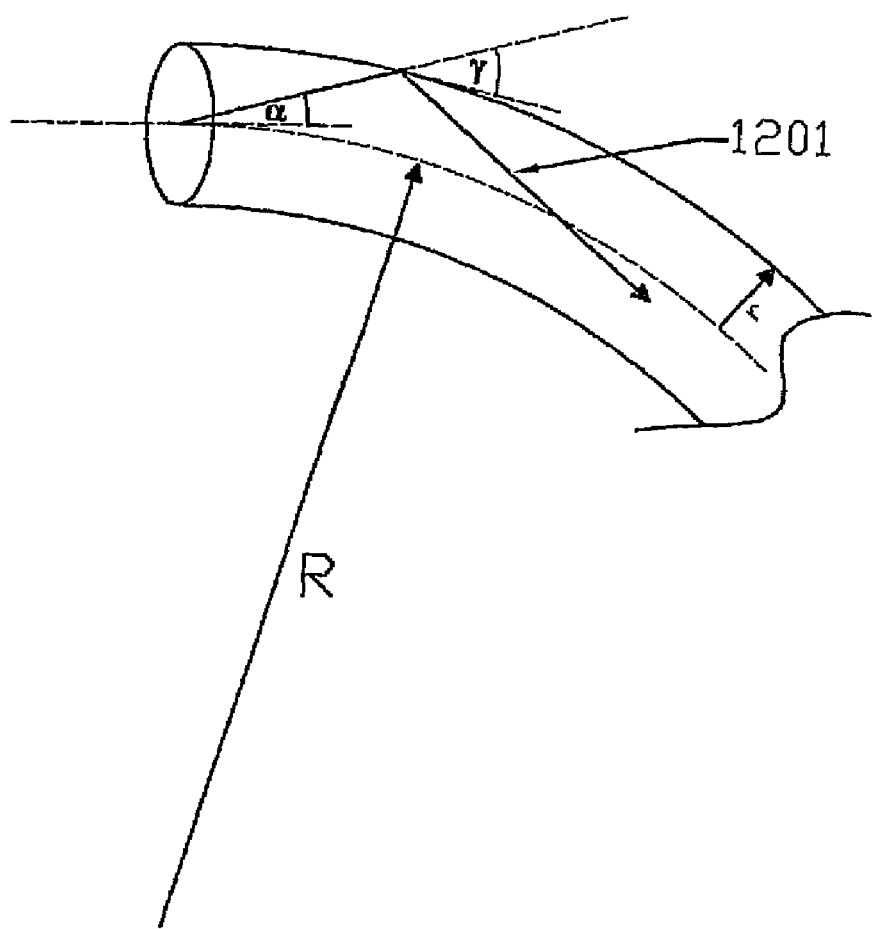
FIG. 12 shows rays in a bent fibre.

There are a number of constraints on the refractive index structure. It was previously stated that $n_1>n_2>n_3>n_4$. Furthermore, it is preferable that the first cladding should have a numerical aperture equal to and ideally greater than that of the core ($NA_{clad1} \geq NA_{core}$) if it is to guide stray light from a splice point. However, this constraint is not strong enough to get the full benefit of the first cladding waveguide. Specifically, when light is coupled into a bent multimode waveguide, the rays that propagate on the outside of the bend are incident on the core cladding interface at a higher angle than the angle at which they were launched due to the curvature of the waveguide. This is illustrated by FIG. 12. A ray 1201 is shown being launched into the core of a bent multimode waveguide at an angle $\alpha$ to the axis. This multimode waveguide represents the pedestal in the fibre laser; the core of the pedestal waveguide is taken to have a refractive index $n_2$; the cladding is taken to have refractive index $n_3$; the diameter of the pedestal is r; the radius of curvature is R. Due to the curvature, the ray angle $\gamma$ at the point where the ray is incident upon the core-cladding boundary is generally not equal to $\alpha$. In one limiting case, where the ray propagates towards the outside of the curve $\gamma$ may be significantly larger than $\alpha$. It can be shown using a geometrical argument that for this case:

$$\gamma = \frac{\pi}{2} - \mathrm{Sin}^{-1}\left(\frac{R}{R+r} \cdot \mathrm{Sin}\left(\frac{\pi}{2} + \alpha\right)\right) \quad (3)$$

Figure 13:
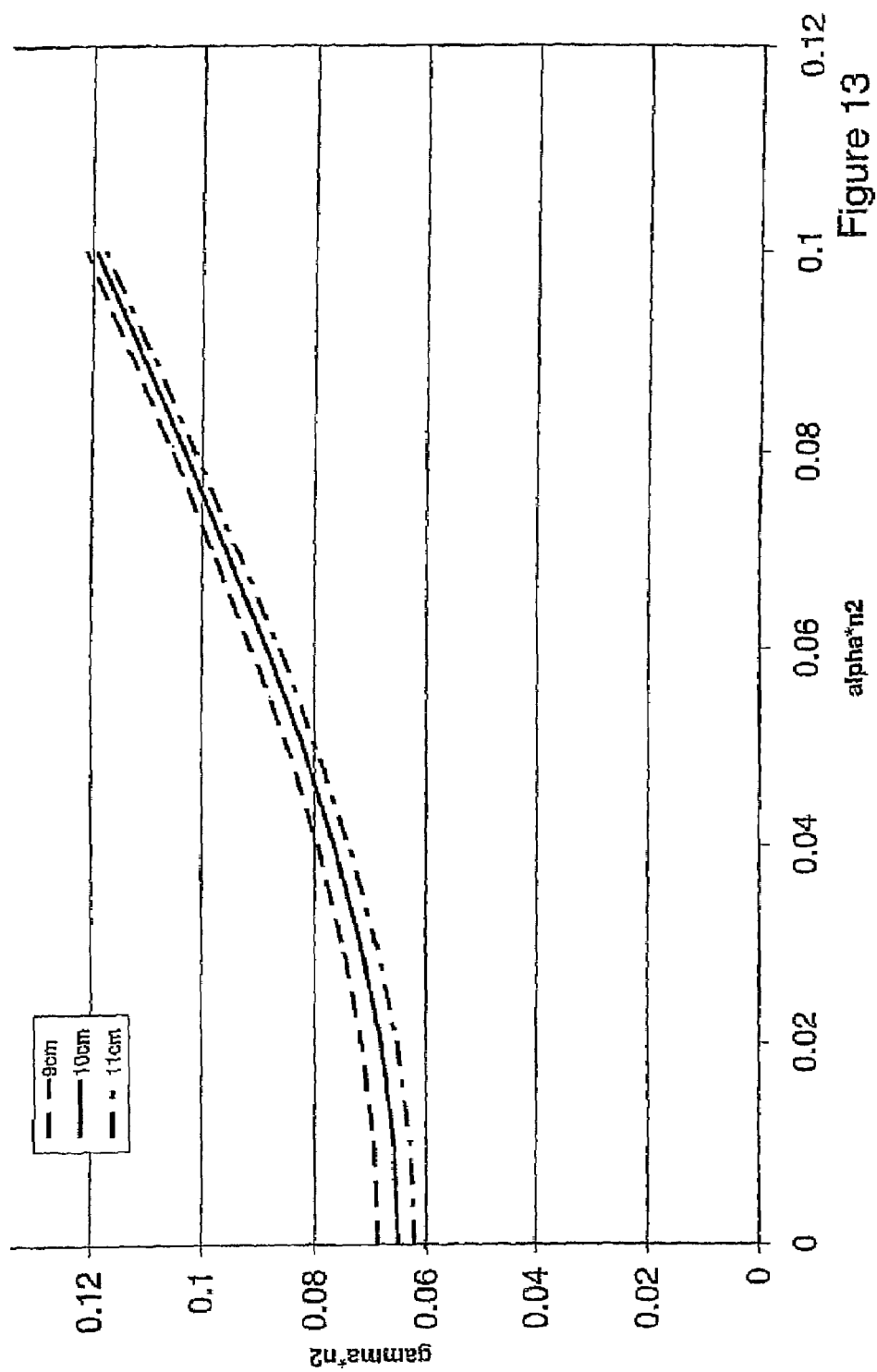
FIG. 13 shows the relationship between $n_2 \cdot \gamma$ and $n_2 \cdot \alpha$ for different radius values.

Equation (3) is plotted in FIG. 13. It shows the relationship between $n_2 \cdot \alpha$ and $n_2 \cdot \gamma$ for several different values of R and a pedestal having a diameter of 100 microns assuming that $n_3$ is a pure silica cladding layer. It shows that even a ray launched on-axis may be incident at an angle such that $n_2 \cdot \gamma$ is greater than 0.06. For the relatively small ray angles of interest, if $n_2 \cdot \gamma$ reaches or exceeds the numerical aperture of the pedestal, $NA_{clad1}=\sqrt{n_2^2-n_3^2}$, the ray 1201 will start to experience significant losses into the cladding. From a design perspective, this means that $NA_{clad1}$ must be chosen to be higher than the maximum value of $n_2 \cdot \gamma$ likely to occur, in order to get the full benefit of the pedestal waveguide. The maximum value of $n_2 \cdot \gamma$ is calculated from equation (3) and knowledge of the maximum likely value of $\alpha$. If the ray 1201 is assumed to be a stray ray of light escaping from the core of a multi-clad fibre at a splice point, then to a reasonable approximation the maximum value of $n_2 \cdot \alpha = NA_{core} = \sqrt{n_1^2 - n_2^2}$. Combining this with equation 3, the numerical aperture of the first cladding layer is given by:

$$NA_{clad1} > n_2 \gamma_{max} = n_2 \cdot \left( \frac{\pi}{2} - \sin^{-1}\left( \frac{R}{R+r} \cdot \sin\left( \frac{\pi}{2} + \frac{NA_{core}}{n_2} \right) \right) \right) \quad (4)$$

Equation (4) is an additional constraint on the refractive index structure of the multi-clad fibres. However, partial benefit of the inventive concept may be achieved with a slightly lower $NA_{clad1}$ than is theoretically optimal.

Another aspect of the invention is the relationship between the pump light and the pedestal waveguide. It is considered undesirable for the pedestal waveguide to capture and guide any of the pump radiation launched into the end of the multi-clad fibres. This is because of the effect of skew rays. In a multimode waveguide with circular cross-section, pump light in skew modes can propagate through the waveguide in a spiral path without intersecting the core and is therefore only weakly absorbed. This lower rate of pump absorption may reduce the efficiency of the laser. One solution is to use a non-circular cladding in the pump waveguide, which scatters the skew rays into modes that do intersect the core. However, light guided by the pedestal will not strike the polygonal cladding of the pump waveguide and will not be scattered. The extension of the pedestal through the un-doped multi-clad fibre and the feed-through fibre in this invention prevents the pedestal from capturing pump light launched from the multimode pump fibres since light will not couple into the pedestal from the side and be guided by it. In this way the invention avoids the problem of pump guiding by the pedestal.

In practical situations it is recognised that there will be tolerances on the dimensions of the fibres and the cladding layers within the fibres. There will also be tolerances on the refractive indices of these layers. The embodiments described here assume that it is generally not possible to exactly manufacture the geometry and refractive indices of the pedestals in different fibres without accounting for manufacturing tolerances.

Embodiment as an Amplifier

One application of practical interest is the use of the inventive structure as a uni-directional amplifier. Optical fibre amplifiers may be constructed with a wide range of operating parameters. By way of example the output power may range from a few Watts to thousands of Watts average power. The laser signal used as an input to the amplifier may be pulsed or CW. In the pulsed case, the pulse width may range from seconds down to tens of femtoseconds and the repetition rate from a few Hz to GHz.

Figure 14:
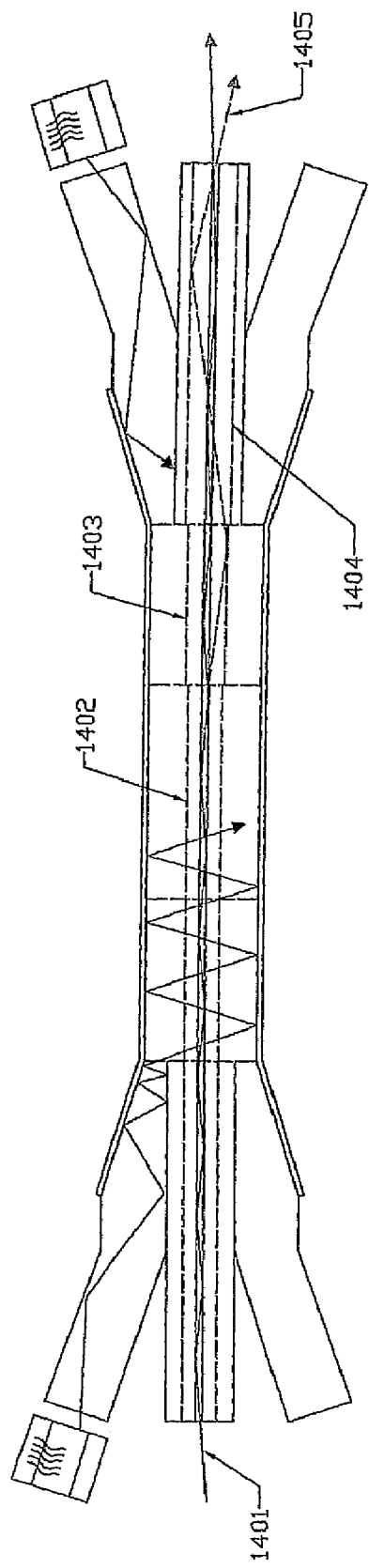
FIG. 14 shows a uni-directional amplifier.

When operating such an amplifier, a laser signal 1401 is coupled into the core of the structure from one side (the left in FIG. 14) and an amplified signal is output from the other side (the right in FIG. 14). It may be that the laser signal travelling in the reverse direction is very much smaller than the forward-travelling signal. In this case, the maximum pump protection may be achieved by successively increasing the pedestal diameter from the doped fibre 1402 to the relay fibre 1403 and into the feed-through fibre 1404 on the output side of the amplifier. This step up has the effect of increasing the pump isolation because the coupling efficiency between two multi-mode waveguides with slightly different diameters is directional, and higher when the power flows from the smaller to the larger waveguide. This may be preferable to specifying the pedestal parameters as identical when in practise they may be slightly smaller or larger within the specified tolerances. In an analogous way, the numerical aperture of the pedestal in the doped fibre, the un-doped multi-clad and the feed-through fibres may also be specified as increasing towards the output to achieve the maximum pump isolation when there is a tolerance on the refractive indices of the manufactured fibres. Other variations along similar lines are also possible.

Embodiment as a Laser

Figure 15:
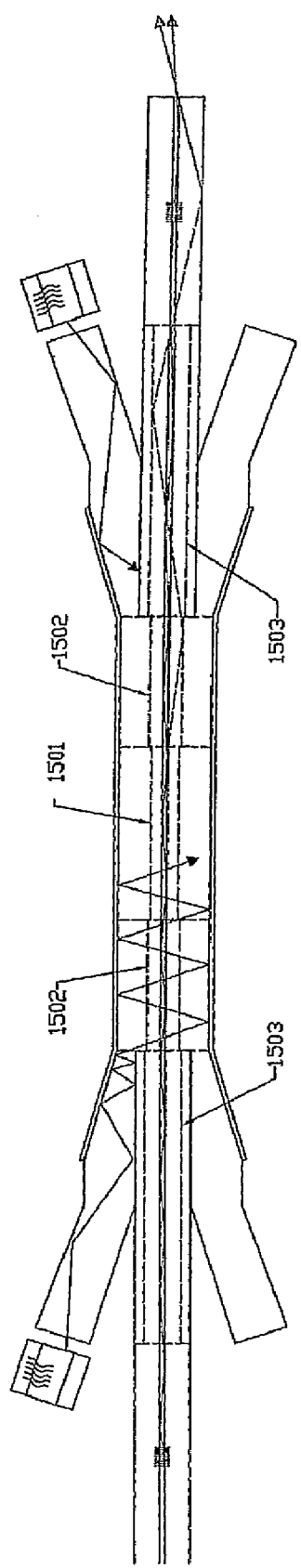
FIG. 15 shows a laser with feed-back from Bragg grating reflectors.

When operating the structure as a laser with feed-back from Bragg grating reflectors as shown in FIG. 15, it may be desirable to increase the pedestal diameter and numerical aperture in both directions away from the central rare earth doped fibre. This is illustrated by pedestal layers 1501, 1502, and 1503. The optimisation of the diameters and numerical apertures depends on the precise operating mode of the laser, the reflectivity of the Bragg reflectors and the losses in the pump combiners.

Using a Cladding Layer of the Pump Fibres as a Second Cladding of Feedthrough

Figure 16:
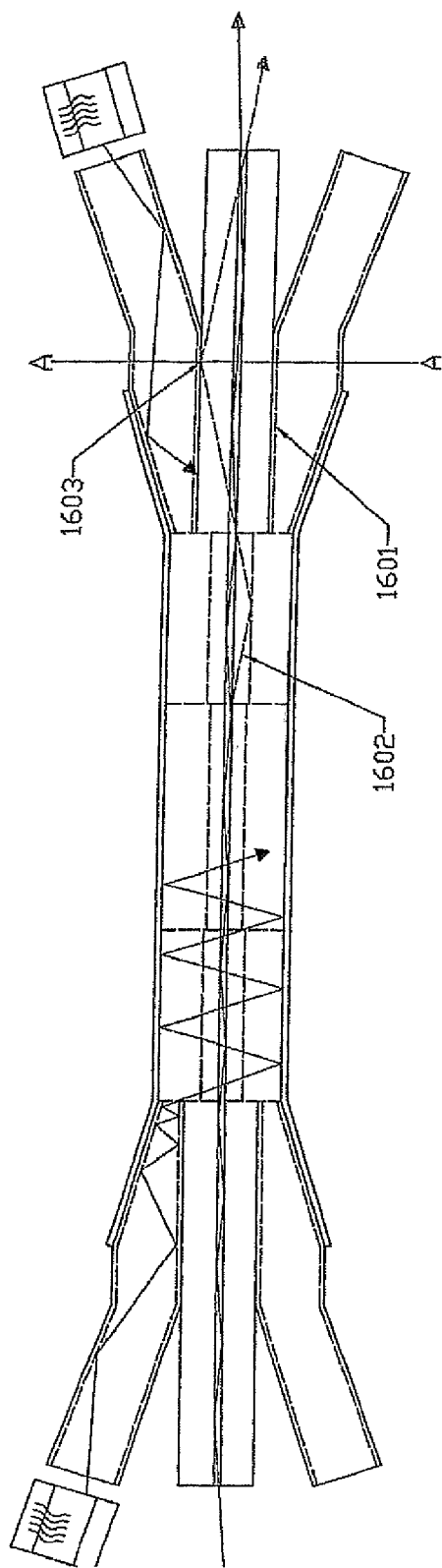
FIG. 16 shows an alternative embodiment.
Figure 17:
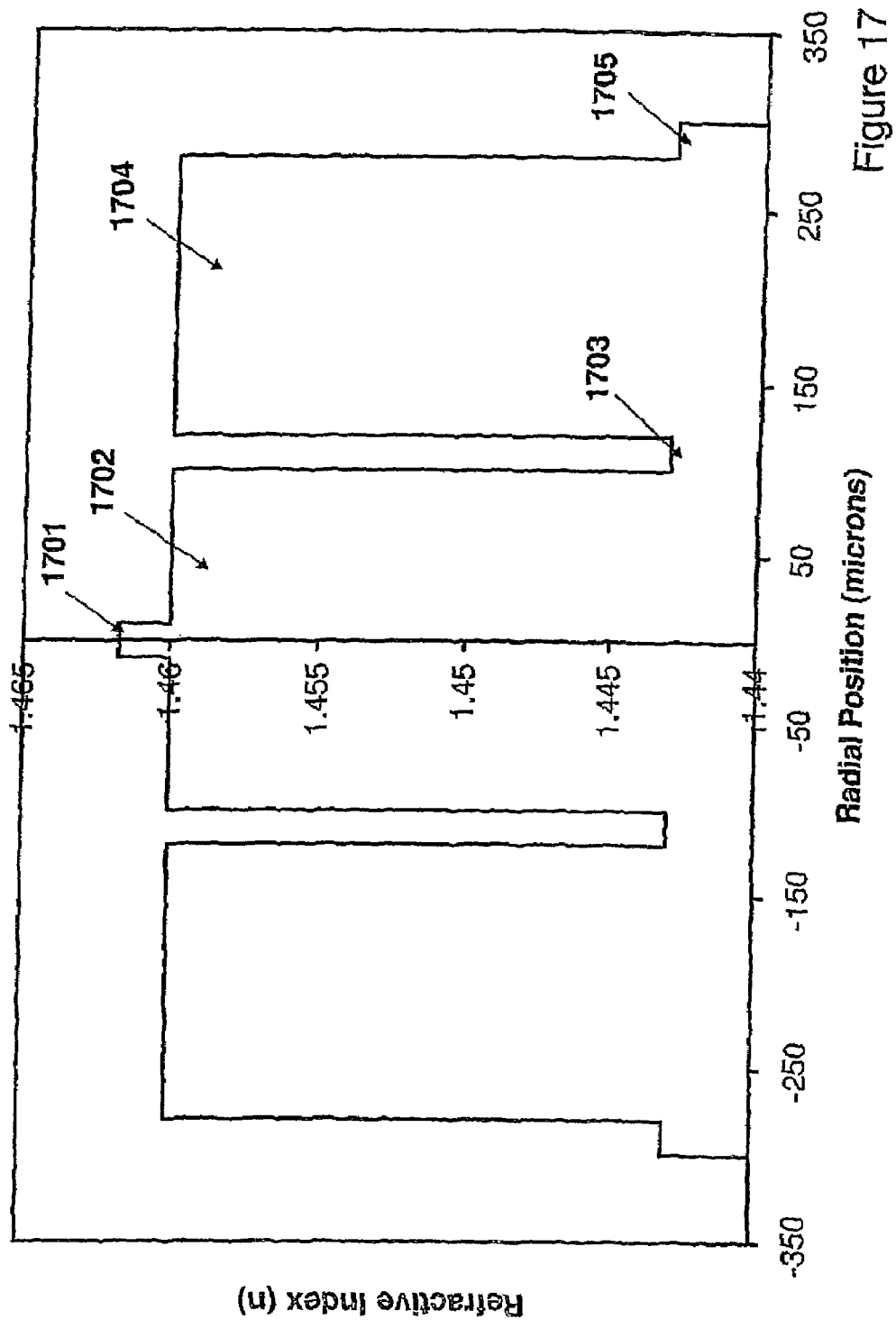
FIG. 17 shows a representative refractive index profile of section A-A in FIG. 16.

In another embodiment, a cladding layer of the tapered pump fibres may also act as the second cladding layer of the feed-through fibre. This is illustrated in FIG. 16. The cladding layer of the pump fibre is represented by the dashed lines inside the pump fibre 1601. A ray of stray signal light 1602 is shown escaping from the core into the pedestal at a splice point. The feed-through fibre does not have a second cladding layer and the stray signal light totally internally reflects at the interface 1603 between the feed-through fibre and the pump fibre. In this case, the core of the feed-through fibre $n_1$, the cladding of the feed-through fibre $n_2$, and the outer cladding layer of the pump fibre having refractive index $n_3$ define the core and first cladding waveguides. FIG. 17 shows an example refractive index profile of the section A-A in FIG. 16. The core 1701 of the feed-through fibre has a raised refractive index $n_1$; the first cladding 1702 of the feed-through is of pure silica construction having a refractive index $n_2$; the cladding layer of the pump fibre 1703 and 1705 has a refractive index $n_3$ suitably lowered with respect to 1702. The core of the pump fibre 1704 is also of pure silica construction. Other material compositions that achieve the required waveguide effects are also possible and considered to lie within the scope of the invention.

Annular Waveguide in Pump and Signal Multiplexer

Figure 18:
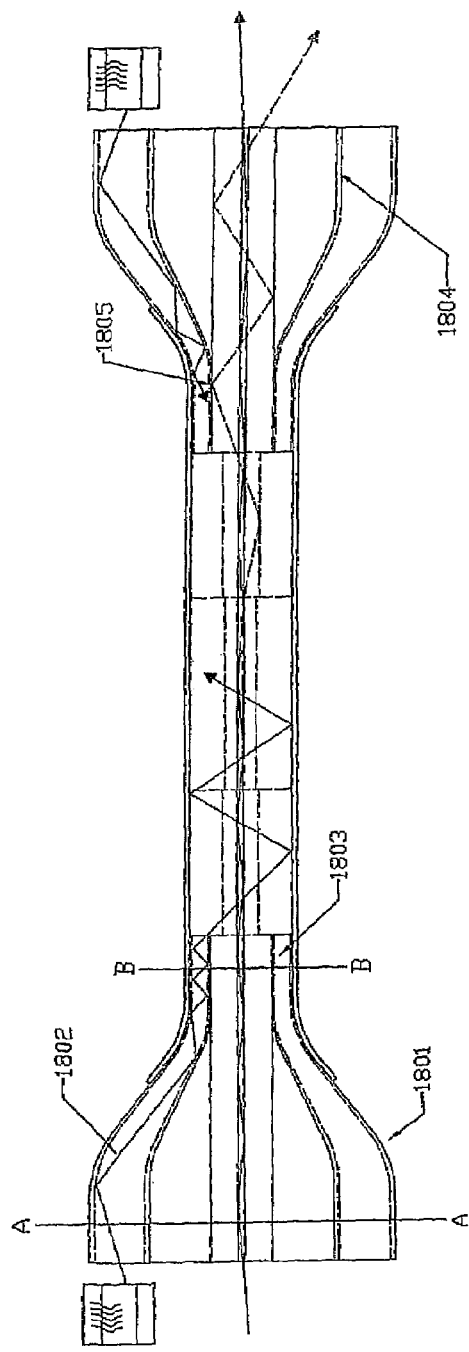
FIG. 18 shows a tapered annular waveguide.

A tapered annular waveguide may be employed instead of a bundle of pump fibres as a means of coupling the pump light into the multi-clad fibres. This is illustrated in FIG. 18. 1801 is a tapered multimode annular waveguide, 1802 is a ray of pump light guided by the waveguide, 1803 is a fused region where the annular waveguide and the signal feed-through fibre are fused together. In other respects, the laser or amplifier is as previously described. The annular waveguide may have a low refractive index cladding layer 1804 that serves as a second cladding of the feed-through fibre and guides the stray signal light 1805 as previously described. The annular waveguide may alternatively be constructed entirely of a glass having a low refractive index appropriate for operation as substitute for the second cladding layer of the feed-through fibre.

Properties of the Core

The core of the feed-through, un-doped and doped multi-clad fibres may support a single transverse mode, a few transverse modes or many transverse modes. There may also be changes in the properties of the core in the laser or amplifier structure, for example an increase or decrease in core diameter.

Glass Composition

The glasses used to construct the laser will typically be based on silica $SiO_2$ with additional elements such as germanium, aluminium, phosphor, boron, fluorine etc incorporated as required to alter the optical or physical properties of the glass such as refractive index or melting point. One or more rare earth dopants may be incorporated in the doped multi-clad fibre for example erbium, ytterbium, thulium, neodymium.

What is claimed is:

1. An optical fibre amplifier system, comprising:
   one or more multimode pump laser diodes;
   a multiplexer for providing pumping radiation from the one or more multimode pump laser diodes to a rare-earth-doped multi-clad optical fibre having at least two cladding layers; and
   a passive multi-clad optical fibre having at least three cladding layers, one of the layers being an intermediate cladding layer, said passive multi-clad optical fibre being provided in line in a signal path for the laser signal between the multiplexer and the rare-earth-doped multi-clad optical fibre;
   wherein a fraction of stray radiation originating within the device is captured by at least one of the intermediate cladding layers of the passive multi-clad fibre, resulting in a reduction in the amount of stray radiation impinging upon the pump laser diodes.

2. The optical fibre amplifier system as claimed in claim 1, wherein no external components are used to capture and guide the stray radiation.

3. The optical fibre amplifier system as claimed in claim 1, wherein the stray radiation at least partially derives from one or more splice points in the device.

4. The optical fibre amplifier system as claimed in claim 1, wherein the stray radiation at least partially derives from macro-bending loss from the core of one of the optical fibres in the device.

5. The optical fibre amplifier system as claimed in claim 1, wherein the multiplexer is a portion of undoped fibre, the intermediate cladding layer extending through the doped and undoped portions.

6. The optical fibre amplifier system as claimed in claim 1, wherein the doped fibre has a core with refractive index $n_1$, and numerical aperture $NA_{core}$, and at least three cladding layers at least three of which have successively decreasing refractive indices, $n_2$, $n_3$ and $n_4$ with respect to the core.

7. The optical fibre amplifier system as claimed in claim 1, wherein a fibre is at least positively curved and the relationship between the refractive indices being:

$$\sqrt{n_2^2 - n_3^2} > n_2\left(\frac{\pi}{2} - \mathrm{Sin}^{-1}\left(\frac{R}{R+r} \cdot \mathrm{Sin}\left(\frac{\pi}{2} + \frac{NA_{core}}{n_2}\right)\right)\right)$$

where R is the radius of curvature of the fibre and r is radius from the centre of the core to the outside of the cladding layer having refractive index $n_2$.

8. The optical fibre amplifier system as claimed in claim 1, wherein the refractive index of the core and each successive cladding layer decreases progressively outwards from the core.

9. The optical fibre amplifier system as claimed in claim 1, wherein a cladding layer is noncircular.

10. A fibre laser comprising:
    laser amplifier system according to claim 1,
    at least one high reflectivity mirror, and;
    at least one partially reflecting output coupler separated from the mirror, the mirror and output coupler both operatively coupled to the fibre amplifier gain medium to cause laser oscillation.

11. The fibre laser of claim 10, where the high reflectivity mirror and output coupler are Fibre Bragg Gratings.

12. An optical fibre amplifier system, comprising:
    one or more multimode pump laser diodes;
    a rare-earth-doped multi-clad optical fibre having at least two cladding layers and a core for providing a laser signal;
    a passive multi-clad optical fibre having at least three cladding layers including an inner cladding layer, an intermediate cladding layer and an outer cladding layer, said passive multi-clad optical fibre being provided in line with the core of the rare-earth-doped multi-clad optical fibre; and
    a multiplexer surrounding the passive multi-clad optical fibre, said multiplexer including at least one multiplexer core for providing illumination from the one or more pump laser diodes to the at least two cladding layers of the rare-earth-doped multi-clad optical fibre, wherein an interface between the intermediate cladding layer and the outer cladding layer of the passive multi-clad optical fibre inhibits stray radiation within the rare-earth-doped multi-clad optical fibre from reaching the one or more multi-mode pump laser diodes.

13. The optical fibre amplifier system as claimed in claim 12, wherein said system further includes one or more splice points at which the stray radiation may originate.

14. The optical fibre amplifier system as claimed in claim 12, wherein said system includes two multiplexers, each of which receives illumination from at least one multimode pump laser diodes.

15. The optical fibre amplifier system as claimed in claim 14, wherein each multiplexer includes a plurality of multiplexer cores.

16. The optical fibre amplifier system as claimed in claim 12, wherein at least one cladding layer is non-circular in cross-sectional shape.

17. The optical fibre amplifier system as claimed in claim 12, wherein said system further includes a highly reflective mirror and a partially reflecting output coupler such that the optical fibre amplifier system provides a fibre laser.

18. The optical fibre amplifier system as claimed in claim 17, wherein said highly reflective mirror and said partially reflecting output coupler are formed of Bragg gratings.

* * * * *